US010699396B2

(12) United States Patent
Aydin et al.

(10) Patent No.: US 10,699,396 B2
(45) Date of Patent: Jun. 30, 2020

(54) SALIENCY-WEIGHTED VIDEO QUALITY ASSESSMENT

(71) Applicant: Disney Enterprises, Inc., Burbank, CA (US)

(72) Inventors: Tunc Ozan Aydin, Zurich (CH); Nikolce Stefanoski, Zurich (CH); Aljoscha Smolic, Aarau (CH); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 344 days.

(21) Appl. No.: 15/886,776

(22) Filed: Feb. 1, 2018

(65) Prior Publication Data

US 2018/0158184 A1 Jun. 7, 2018

Related U.S. Application Data

(62) Division of application No. 14/954,652, filed on Nov. 30, 2015, now Pat. No. 9,922,411.

(51) Int. Cl.
*G06T 7/00* (2017.01)
*H04N 17/00* (2006.01)
(Continued)

(52) U.S. Cl.
CPC ......... *G06T 7/0002* (2013.01); *H04N 17/004* (2013.01); *H04N 19/00* (2013.01);
(Continued)

(58) Field of Classification Search
CPC ......... G06T 7/0002; G06T 2207/10016; G06T 2207/30168; H04N 19/00; H04N 19/85; H04N 17/004
See application file for complete search history.

(56) References Cited

U.S. PATENT DOCUMENTS 6,933,953 B2 *  8/2005  Dantwala .................. G06T 5/20
                                               345/617
7,133,571 B2 * 11/2006  Cheatle ..................... G06K 9/38
                                               382/282

(Continued)

OTHER PUBLICATIONS

Perazzi et al., Saliency filters: Contrast based filtering for salient region detection, IEEE CVPR, Jun. 2012, pp. 733-740.
(Continued)

*Primary Examiner* — Manav Seth
(74) *Attorney, Agent, or Firm* — Farjami & Farjami LLP (57) ABSTRACT

Systems and methods are disclosed for weighting the image quality prediction of any visual-attention-agnostic quality metric with a saliency map. By accounting for the salient regions of an image or video frame, the disclosed systems and methods may dramatically improve the precision of the visual-attention-agnostic quality metric during image or video quality assessment. In one implementation, a method of saliency-weighted video quality assessment includes: determining a per-pixel image quality vector of an encoded video frame; determining per-pixel saliency values of the encoded video frame or a reference video frame corresponding to the encoded video frame; and computing a saliency-weighted image quality metric of the encoded video frame by weighting the per-pixel image quality vector using the per-pixel saliency values.

20 Claims, 7 Drawing Sheets

(3 of 7 Drawing Sheet(s) Filed in Color)

(51) Int. Cl.
*H04N 19/85* (2014.01)
*H04N 19/00* (2014.01)

(52) U.S. Cl.
CPC .... *H04N 19/85* (2014.11); *G06T 2207/10016* (2013.01); *G06T 2207/30168* (2013.01)

(56) References Cited

U.S. PATENT DOCUMENTS

| | | | | |
|---|---|---|---|---|
| 7,512,286 | B2* | 3/2009 | Luo | G06K 9/00268 382/190 |
| 7,545,985 | B2* | 6/2009 | Zhang | G06K 9/036 382/224 |
| 7,590,287 | B2* | 9/2009 | Lu | G06K 9/00711 382/190 |
| 7,760,956 | B2* | 7/2010 | Lin | G06K 9/00711 382/254 |
| 8,218,854 | B2* | 7/2012 | Liu | G06T 17/20 382/154 |
| 8,422,795 | B2* | 4/2013 | Pahalawatta | G06T 7/0002 382/197 |
| 8,503,531 | B2* | 8/2013 | Aoyama | G06T 7/238 375/240.16 |
| 8,712,157 | B2* | 4/2014 | Marchesotti | G06T 7/0002 382/190 |
| 8,849,014 | B2* | 9/2014 | Cheng | G06T 15/20 382/154 |
| 8,885,901 | B1* | 11/2014 | Solanki | G16H 30/20 382/128 |
| 8,897,604 | B2* | 11/2014 | Deng | G06T 7/0002 382/305 |
| 8,938,116 | B2* | 1/2015 | Kennedy | G06T 11/60 345/660 |
| 8,958,662 | B1* | 2/2015 | Grosz | G06T 3/4038 382/118 |
| 9,176,989 | B2* | 11/2015 | Deng | G06T 7/0002 |
| 9,219,830 | B1* | 12/2015 | Ciorba | H04N 1/00177 |
| 9,230,176 | B2* | 1/2016 | Choi | G06T 7/20 |
| 9,338,348 | B2* | 5/2016 | Sivan | H04N 5/23222 |
| 9,412,024 | B2* | 8/2016 | Chaudhury | G06T 7/0002 |
| 9,569,832 | B2* | 2/2017 | Zavesky | G06K 9/6202 |
| 9,646,227 | B2* | 5/2017 | Suri | G06K 9/6256 |
| 9,661,226 | B2* | 5/2017 | Sivan | H04N 5/23222 |
| 2005/0089246 | A1* | 4/2005 | Luo | G06K 9/00268 382/286 |
| 2006/0147107 | A1* | 7/2006 | Zhang | G06K 9/036 382/159 |
| 2006/0233442 | A1* | 10/2006 | Lu | G06K 9/00711 382/190 |
| 2008/0019661 | A1* | 1/2008 | Obrador | G11B 27/034 386/210 |
| 2009/0278958 | A1* | 11/2009 | Bregman-Amitai | H04N 5/23219 348/231.99 |
| 2011/0311147 | A1* | 12/2011 | Pahalawatta | G06T 7/0002 382/197 |
| 2012/0269441 | A1* | 10/2012 | Marchesotti | G06T 7/0002 382/195 |
| 2014/0078307 | A1* | 3/2014 | Choi | G06T 7/20 348/155 |
| 2014/0267381 | A1* | 9/2014 | Young | G06T 7/0002 345/619 |
| 2015/0078654 | A1* | 3/2015 | Chaudhury | G06T 7/0002 382/159 |
| 2015/0288874 | A1* | 10/2015 | Sivan | H04N 5/23222 348/207.11 |
| 2016/0034786 | A1* | 2/2016 | Suri | G06K 9/6256 382/159 |
| 2016/0191801 | A1* | 6/2016 | Sivan | H04N 5/23222 348/208.12 |
| 2016/0335754 | A1* | 11/2016 | Aaron | H04N 21/4666 |

OTHER PUBLICATIONS

Wang et al., Image quality assessment: from error visibility to structural similarity, Image Processing, IEEE Transactions, Apr. 2004, pp. 600-612, 13 (4).

* cited by examiner

FIG. 6

SALIENCY-WEIGHTED VIDEO QUALITY ASSESSMENT

CROSS-REFERENCE TO RELATED APPLICATIONS

This application is a divisional of and claims priority to U.S. patent application Ser. No. 14/954,652 filed on Nov. 30, 2015 and titled "SALIENCY-WEIGHTED VIDEO QUALITY ASSESSMENT."

TECHNICAL FIELD

The present disclosure relates generally to video quality assessment techniques, and more particularly, some embodiments relate to systems and methods for providing saliency-weighted video quality assessment.

DESCRIPTION OF THE RELATED ART

The goal of automated video quality assessment is obtaining a quantitative measure that is highly correlated with the perceived quality of the input visual content. Currently, video quality assessment and control is mostly done interactively by quality experts, who have to inspect the produced (e.g., transcoded) versions of the evaluated content and make sure that they conform to corresponding quality requirements. Automated video quality assessment tools are highly desired in content distribution workflows due to their potential to significantly reduce the amount of manual work required during the quality control process. However, automated methods can only be trusted if they consistently provide quality predictions that are correlated with the subjectively perceived content quality.

BRIEF SUMMARY OF THE DISCLOSURE

According to various embodiments of the technology disclosed herein, systems and methods are disclosed for providing saliency-weighted video quality assessment. In one embodiment, an assessed image is received at a non-transitory computer readable medium. In this embodiment, one or more processors: determine a per-pixel image quality vector of the assessed image; determine per-pixel saliency values of the assessed image or a reference image corresponding to the assessed image; and compute a saliency-weighted image quality metric of the assessed image by weighting the per-pixel image quality vector using the per-pixel saliency values. In various implementations of this embodiment, the assessed image is an encoded video frame corresponding to a video, and the steps of determining a per-pixel image quality vector, determining per-pixel saliency values, and computing a saliency-weighted image quality metric are repeated for a plurality of encoded video frames that correspond to the video.

In some embodiments, the per-pixel image quality vector of the assessed image is determined by comparing the assessed image with a corresponding reference image. In alternative embodiments, the per-pixel image quality vector of the assessed image is determined using a blind quality assessment method or a reduced-reference quality assessment method.

In some embodiments, a graphical user interface (GUI) may be provided for performing saliency-weighted video quality assessment. In these embodiments, a saliency-weighted image quality metric may be determined for a plurality of encoded video frames corresponding to a video, and the GUI may display a time plot of the saliency-weighted image quality metric for each of the encoded video frames corresponding to the video. In yet further embodiments, the GUI may display a visual comparison of each of the encoded video frames and corresponding reference video frames that are not encoded.

In one embodiment, a method of video quality assessment includes: receiving an encoded video; determining a saliency-weighted image quality metric for each video frame of the encoded video; determining video frames of the encoded video with a saliency-weighted image quality metric that is below a threshold; and assembling a playlist including the video frames of the encoded video with a saliency-weighted image quality metric that is below the threshold.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

An overlooked but highly influential aspect of human vision in video quality assessment is visual attention. Each video sequence (even more so in cinematic content) often has one or more salient elements that are likely to catch the viewer's attention. As a result, most viewers' gaze is fixated in a subset of the content presented on the display. A visual artifact in a salient image region is subjectively more disturbing than another artifact with the same magnitude but located in a non-salient region.

In accordance with embodiments of the technology disclosed herein, systems and methods are disclosed for weighting the image (e.g., video frame) quality prediction of any visual-attention-agnostic quality metric with a saliency map. By accounting for the salient regions of the image, the disclosed system and method may dramatically improve the precision of the visual-attention-agnostic quality metric. In a particular embodiment, the visual-attention-agnostic quality metric is the Structural Similarity (SSIM) index metric and the saliency map is determined by applying a contrast-based saliency estimation method.

In some embodiments, the saliency-weighted video quality assessment method may be implemented using an application including a graphical user interface (GUI). In these embodiments, the video quality assessment may be performed fully automatically, and the results can be stored, displayed and communicated in various ways, to assist users in a variety of different quality assessment applications. In a particular implementation of this embodiment, the application may assemble a playlist of video frames that fall below a particular quality threshold (as determined by the saliency-weighted video quality assessment method) for playback by the GUI for further quality assessment.

Figure 1:
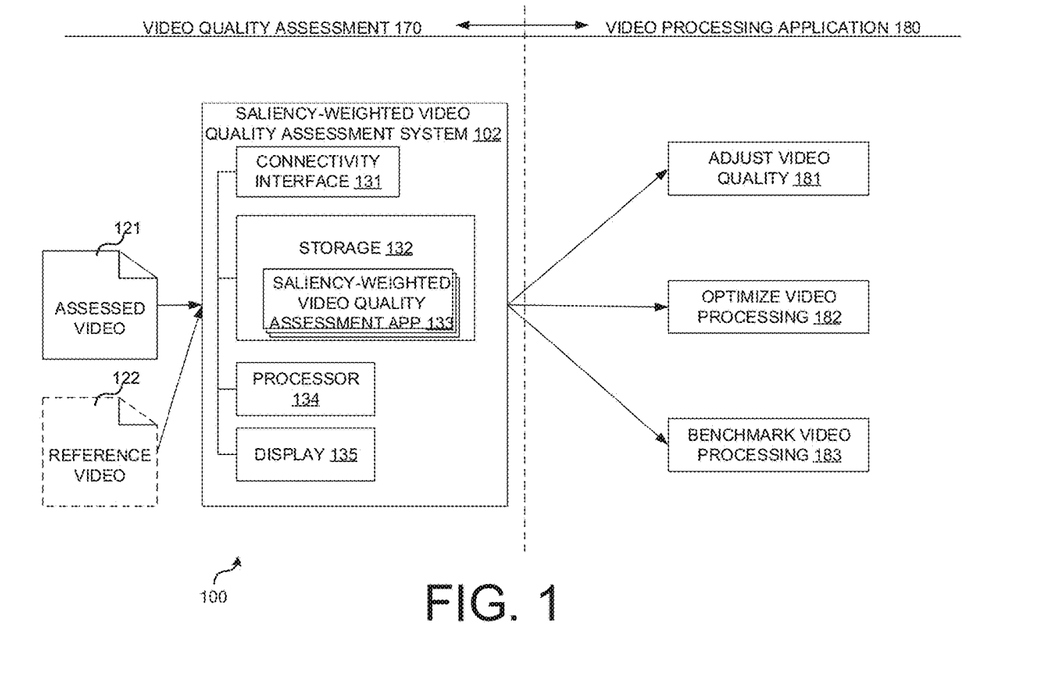
FIG. 1 illustrates an example environment in which saliency-weighted video quality assessment may take place in accordance with the present disclosure.

Before describing the invention in detail, it is useful to describe an example environment in which the invention can be implemented. FIG. 1 illustrates one such example environment 100.

In environment 100, an assessed video 121 (e.g., encoded video) is received for objective saliency-weighted video quality assessment (step 170) by saliency-weighted video quality assessment system 102. The assessed video 121 may include a film, a trailer, an episode from a series, a commercial, a video game cutscene, and the like. In some embodiments, illustrated by FIG. 1, the video quality assessment of video 121 may be conducted using a full reference method, i.e., by comparing video 121 to an uncompressed and distortion-free (e.g., unencoded) reference video 122. In alternative embodiments (e.g., where a full quality reference video 122 is unavailable), the video quality assessment method may be conducted using a blind quality assessment method (no reference video available) or a reduced-reference quality assessment method (some information relating to the full quality video is available for comparison). As a result of the saliency-weighted video quality assessment step 170, an objective metric of video quality (e.g., a normalized number metric between 0 and 1) may be provided for each frame of the assessed video 121, video 121 as a whole, or some combination thereof.

Following video quality assessment of video 121 by system 170, any number of quality control related video processing applications (step 180) may be implemented. In one embodiment, the quality of assessed video 121 may be adjusted (application 181). For example, a content server transmitting assessed video 121 over a computer network may examine the objective quality metric of video 121 being transmitted and make video bitrate and other appropriate adjustments. As another example of application 181, quality control operators may be notified if quality thresholds are missed. In another embodiment, the objective quality metric may be used to optimize video processing applications used to create assessed video 121 (application 182). For example, a user, an automated software application, or some combination thereof may adjust algorithms and parameter settings (e.g., transcoding parameters) of a video processing system or application used to create assessed video 121. In yet another embodiment, the objective quality metric may be used to benchmark a video processing system or application used to create assessed video 121 (application 183).

As would be appreciated by one having skill in the art, any number of video processing applications 180 may be implemented following video quality assessment 170. Moreover, steps 170 and 180 may be recursively repeated to assist in applications such as monitoring and adjusting the quality of assessed video 121, optimizing a video processing application, benchmarking a video processing application, and the like.

Referring back to saliency-weighted video quality assessment system 102, in various embodiments, system 102 may be any computing system (workstation, laptop, smartphone, etc.) configured to receive a video 121 or image and determine an objective video quality or image quality metric using a saliency-weighted assessment method. As illustrated, system 102 includes a connectivity interface 131, storage 132 for storing a saliency-weighted video quality assessment application 133 and assessed videos 121 or images, processor 134, and one or more displays 135.

Processor 134 executes a saliency-weighted video quality assessment application 133 that determines one or more saliency-weighted metrics for objectively assessing the quality of an input video 121 when compared with a full quality reference video 122. In some embodiments, the objective metric of video quality may be provided for each frame of the assessed video 121, video 121 as a whole, or some combination thereof.

In some embodiments, further described below, application 133 provides a GUI for a user (e.g., quality control specialist) to visualize (e.g., using display 135) and evaluate the assessed video using the saliency-weighted video quality metrics. For example, for an assessed video 121, application 133 may display a plot showing the saliency-weighted quality of each video frame as a function of its sequence in the video's time code, a determined saliency map for each assessed video frame, a visual comparison between the assessed video 121 and reference video 122, and other video quality assessment tools. In these embodiments, application 133 may be integrated as part of a video editing application, an image editing application, a video game design application, or some combination thereof. In this manner, a quality control specialist may immediately take corrective action based on the assessed quality of the video.

In one embodiment, application 133 may be integrated as part of a content creation and distribution application that distributes the assessed video 121. For example, if the quality of assessed video 121 falls below a certain quality threshold, the application may automatically adjust transcoding parameters to create and distribute a new video 121 that meets the quality threshold. In these embodiments, connectivity interface 131 may connect system 102 to a content distribution network using a wired or wireless network connection such as a local area network connection, a cellular network connection, a satellite network connection, or the like.

Although example environment 100 was primarily described with respect to the saliency-weighted assessment of video quality for use in video processing applications, it should be noted that in other embodiments the invention may be implemented in an environment that focuses on the saliency-weighted assessment of image quality for use in image processing applications.

Figure 2:
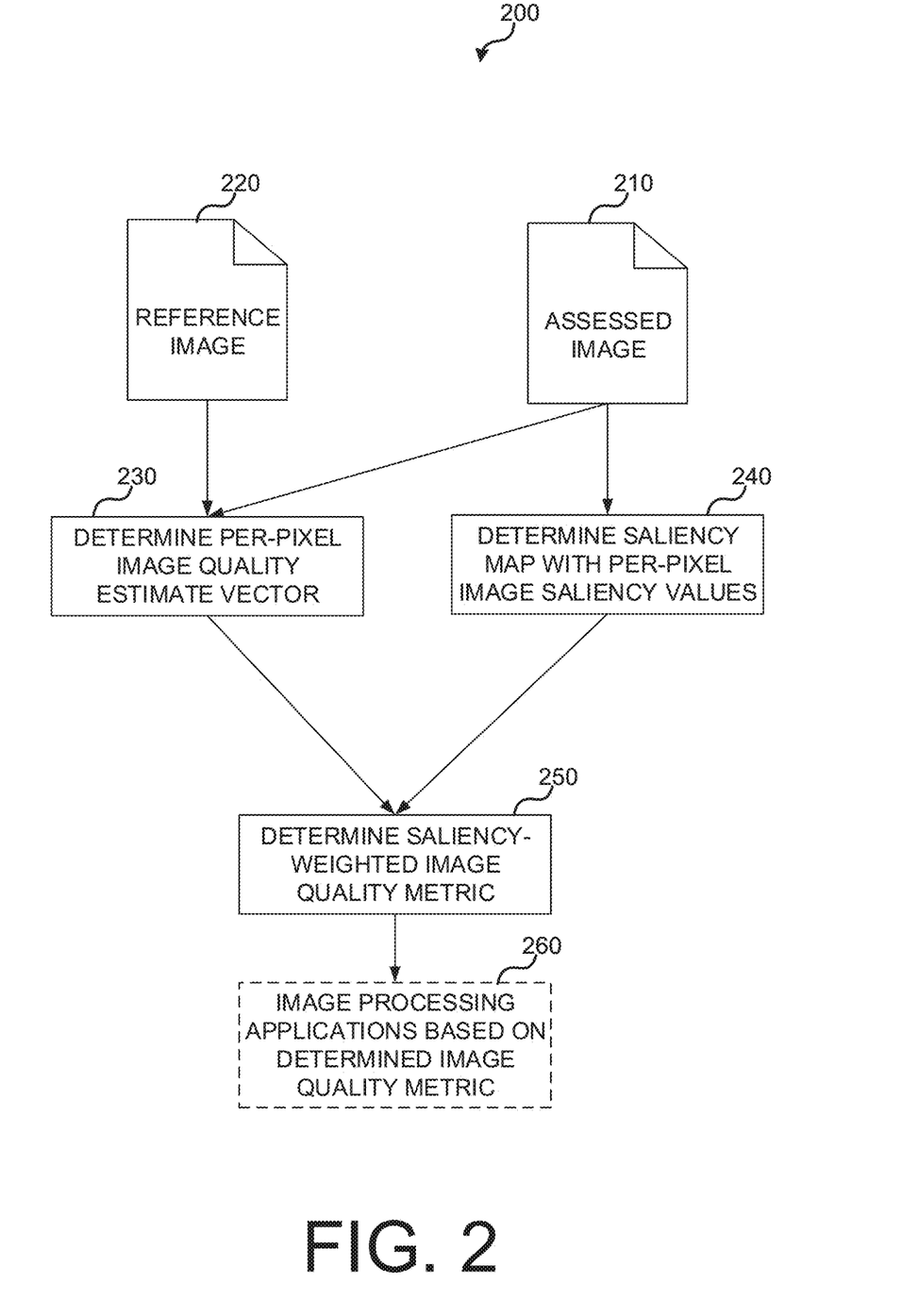
FIG. 2 is an operational flow diagram illustrating a method of saliency-weighted image quality assessment in accordance with the present disclosure.

FIG. 2 is an operational flow diagram illustrating a method 200 of saliency-weighted image quality assessment in accordance with the present disclosure. Method 200 takes an assessed image 210 (e.g., a video frame) and full quality reference image 220 as inputs, and outputs a saliency-weighted image quality metric for the assessed image 210. As further described below, the saliency-weighted image quality metric is determined by weighting an image quality estimate vector of the image 210 using a saliency map of the image. In various embodiments, some or all of the process operations of method 200 (e.g., determination of image quality vector, determination of saliency map for image, and determination of saliency-weighted image quality metric) may be implemented by system 102 using application 133.

Prior to beginning method 200, system 102 receives an assessed image 210 (e.g., encoded image) and a comparison full quality reference image 220 (e.g., unencoded, raw image) for the saliency-weighted image quality assessment. In some embodiments, various preprocessing operations (not shown) may be performed prior to beginning method 200 to make assessed image 210 and reference image 220 suitable for comparison. For example, application 133 may be used to align and scale the images, transform the color space of the images, gamma-correct the images, and otherwise filter the images in preparation for comparison.

At operation 230, a per-pixel image quality estimate vector is determined for the assessed image 210 by comparing assessed image 210 with reference image 220. The per-pixel image quality estimate provides a per-pixel numerical estimate of the quality of assessed image 210. For example, the per-pixel quality estimate vector may provide an estimate of the quality of each pixel of assessed image 210 as compared with reference image 220.

In one particular embodiment, the per-pixel image quality vector for assessed image 210 is determined using the structural similarity (SSIM) index metric that numerically defines the similarity between assessed image 210 and full quality reference image 220 based on a comparison of the luminance, contrast, and structure of pixels of assessed image 210 and reference image 220. In one embodiment, the SSIM may be mathematically defined by Equation (1):

$$SSIM(I,J)=l(\mu_I,\mu_J)^\alpha c(\sigma_I,\mu_J)^\beta s(\sigma_I,\sigma_J)^\gamma \qquad (1)$$

Where I and J are gamma-corrected input images both having N pixels, comparison functions l, c, and s and denote the luminance, contrast and structure terms, respectively, $\mu$ and $\sigma$ denote the mean and standard deviation, respectively, and $\alpha>0$, $\beta>0$, and $\gamma>0$ are model parameters that control the weights of the three terms of the metric.

In some embodiments, the SSIM metric may be implemented as a multi-scale structural similarity (MS-SSIM) metric. In other embodiments, other full reference metrics such as a visual signal-to-noise ratio (VSNR) metric, peak signal-to-noise ratio (PSNR) metric or mean squared error (MSE) metric may be used for determining the per-pixel image quality vector of assessed image 210. In alternative embodiments, where no reference image 220 is available, blind quality assessment methods or reduced-reference quality assessment methods may be implemented to determine the per-pixel image quality vector. For example, a no-reference image quality metric may be implemented as described in Robert Herzog, Martin Čadík, Tunç O. Aydčin, Kwang In Kim, Karol Myszkowski, Hans-P. Seidel, *NoRM: No-Reference Image Quality Metric for Realistic Image Synthesis*, Computer Graphics Forum, v. 31 n. 2pt4, p. 545-554, May 2012.

At operation 240, a saliency map with per-pixel image saliency values is determined for the assessed image 210. The saliency map identifies image elements that are likely to catch the attention of a human observer. In some embodiments, the saliency map may be determined based on various features of assessed image 210, such as, for example, color variation of individual pixels, edges and gradients, spatial frequencies, structure and distribution of image patches, histograms, or some combination thereof. In particular embodiments, the saliency map may be determined by applying a contrast-based saliency estimation method.

Figure 3:
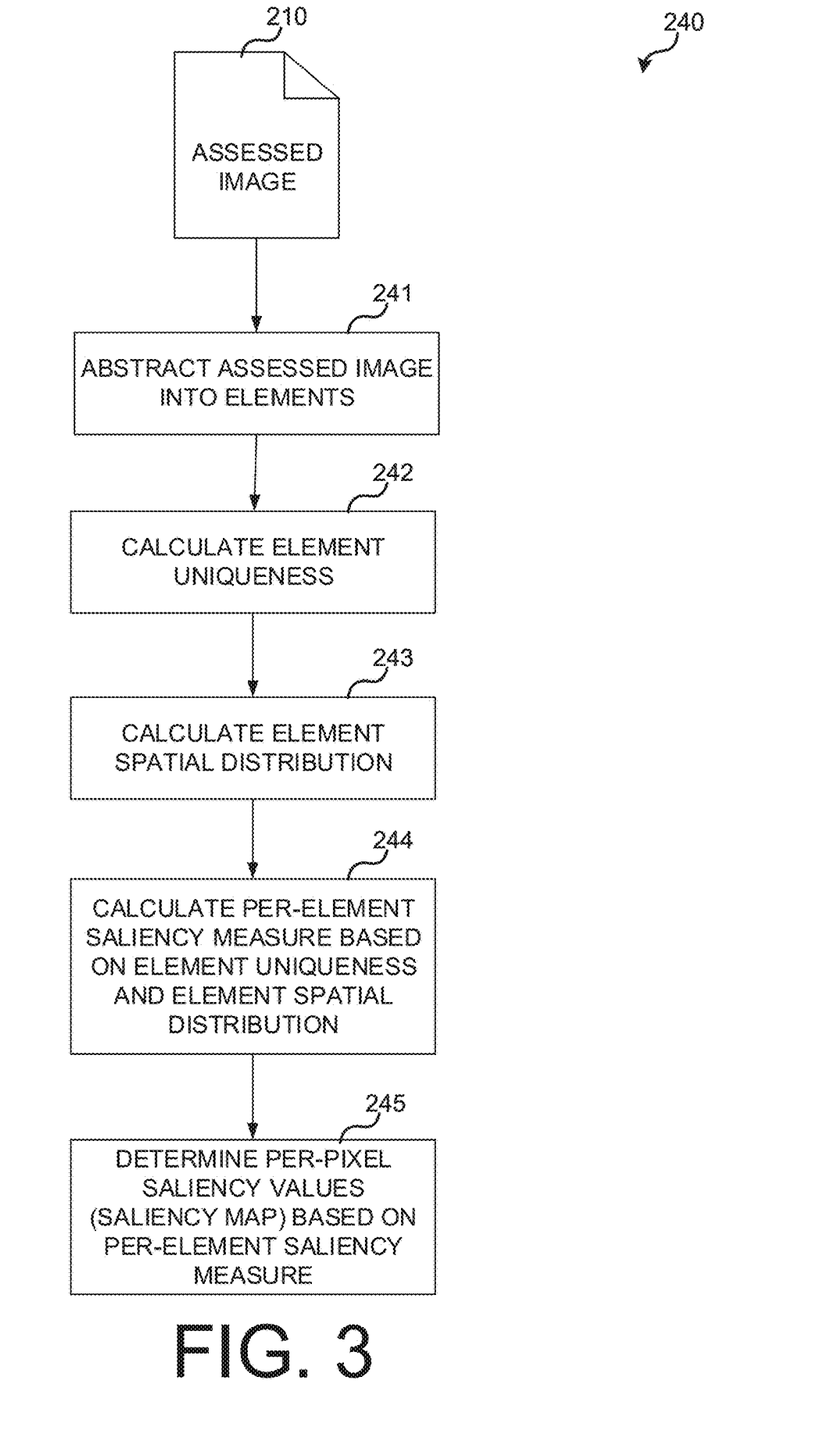
FIG. 3 is an operational flow diagram illustrating an example method of computing a saliency map for an image in accordance with the present disclosure.

FIG. 3 illustrates one such example of a contrast-based saliency estimation method 240 in accordance with embodiments of the technology disclosed herein. The example method of FIG. 3 begins at operation 241, during which the assessed image 210 is abstracted into image elements that preserve relevant structure while removing undesirable details. For example, an adaptation of the simple linear iterative clustering (SLIC) super-pixels process may be used to abstract the image into perceptually homogenous or uniform regions. As used herein to describe an image, the term "element" may be defined as one pixel or a group of pixels having similar features. For a group of pixels having similar features, the features may be the pixels' values or any other features that may be calculated out of the pixels' values, such as features measuring color, texture, disparity or motion. At operation 242, the uniqueness of image elements (i.e., rarity of each element given its position in the image and discriminating feature) is determined. At operation 243, the spatial distribution of the elements is calculated. For example, the spatial variance of an element's color (i.e., occurrence elsewhere in the image) may be determined.

Following determination of the uniqueness and spatial distribution of image elements, at operation 244, these two measures are combined to compute a per-element saliency measure or value. Once per element saliency is computed, at operation 245 the per-pixel saliency values may be derived, thus producing the saliency map. In one embodiment, the per-pixel saliency values may be derived from the per-element saliency values by up-sampling the per-element saliency values with a Gaussian weight. A particular mathematical implementation of method 240 is described in U.S. Pat. No. 9,025,880, titled "Visual saliency estimation for images and video" and issued May 5, 2015, which is herein incorporated by reference in its entirety.

It should be noted that although the determination of the saliency map (operation 240) in the example of FIG. 2 is illustrated as being done on assessed image 210, in alternative embodiments, the saliency map may instead be computed from reference image 220 using the same saliency map determination method.

Referring back to method 200, following determination of the saliency map with per-pixel image saliency values (operation 240) and a per-pixel image quality estimate vector (operation 230), at operation 250 a saliency-weighted image quality metric is determined by weighting the saliency agnostic (i.e., visual-attention-agnostic) per-pixel image quality estimate vector using the per-pixel saliency values of the saliency map. As would be appreciated by one having skill in the art, any visual-attention-agnostic metric that generates per-pixel image quality values may be weighted with a saliency map using the disclosed method. By accounting for the salient regions of the image, the disclosed system and method may dramatically improve the precision of the visual-attention-agnostic quality metric.

In one mathematical implementation, the saliency-weighted image quality metric may be defined by Equation (2):

$$\hat{q} = \frac{1}{N}(q \cdot s^w) \quad (2)$$

Where q̂ is a scalar quality index, (·) denotes the inner product, q is a per-pixel quality estimate vector, which in one embodiment can be obtained using SSIM, vector s contains the corresponding per-pixel saliency values, w is the weight given to the saliency map, and N is the number of pixels in the image.

In various embodiments, method 200 may be used to conduct a saliency-weighted video quality assessment to determine a single quality metric for a video. In such embodiments, method 200 may be repeated for each video frame to compute a quality metric for each video frame, and these individual per-frame quality metrics may be averaged over the entire video sequence. In implementations of these embodiments, the video frames may be weighted prior to averaging.

Following determination of the saliency-weighted image quality metric at operation 250, at optional operation 260, additional image (or video) processing may be conducted based on the determined metric. For example, the quality metric may be used to monitor and adjust image or video quality, optimize image or video processing applications used to create the image or video, benchmark image or video processing systems or application used to create the image or video, and perform other like operations.

Figure 4A:
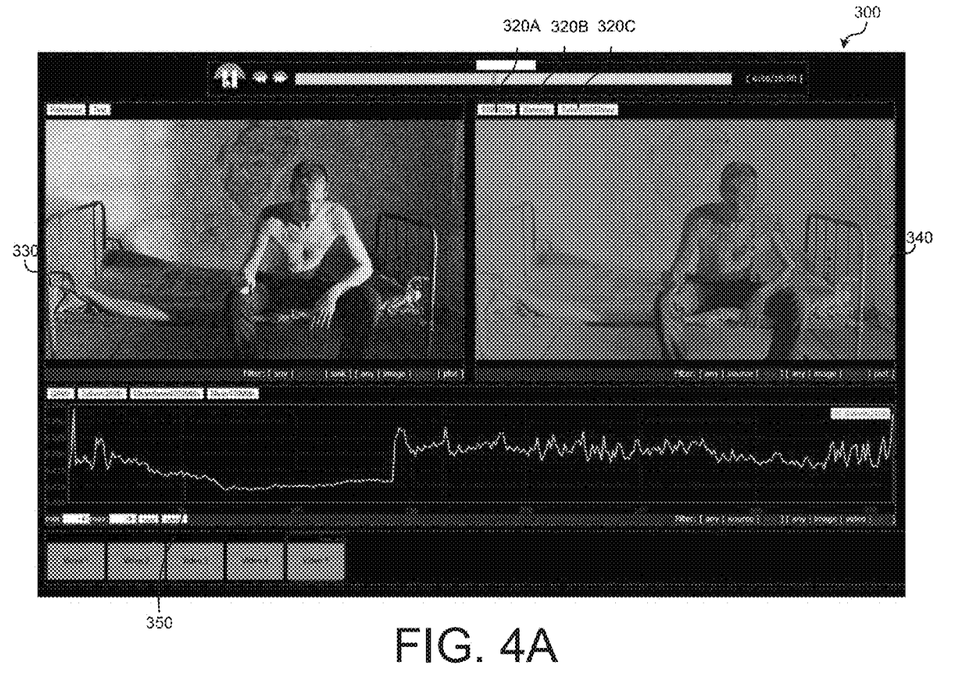
FIG. 4A illustrates an example saliency-weighted video quality assessment graphical user interface that may be used in accordance with the present disclosure.
Figure 4B:
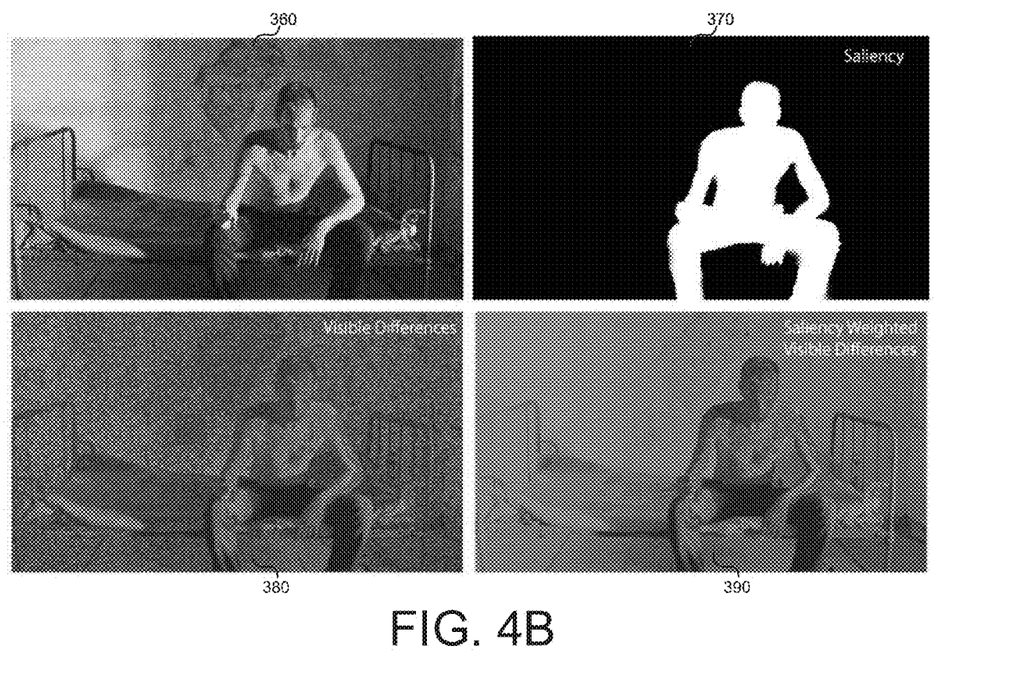
FIG. 4B illustrates an encoded video frame, a corresponding saliency map, and visual differences between the encoded and unencoded video frame that may be displayed by the GUI of FIG. 4A.

In some embodiments, a video quality control specialist, video editor, or other user may utilize an interactive GUI provided by saliency-weighted video quality assessment application 133 to assist in video quality assessment. FIGS. 4A-4B illustrate one particular implementation of a GUI 300 that may be used by a user of system 102 to assess video quality using method 200.

As illustrated in this particular embodiment, interface 300 provides a display 330 that allows a user to watch the video being assessed (e.g., encoded video) or unencoded reference video, and a display 340 that may concurrently provide color coded (where lack of color denotes no visible artifacts) per-pixel visible difference visualization between the reference video and encoded video based on a particular video quality assessment method. GUI 300 additionally includes selectable controls 320A-320C that enable a user to select the video quality assessment method (e.g., saliency-weighted SSIM (control 320C), pure SSIM (control 320A)) being visualized on display 340 or the saliency map (control 320B) of the frame being displayed. For example, in this particular embodiment, the saliency-weighted SSIM control is selected, as highlighted by the color-coded focus on the sitting character of the video.

Additionally, interface 300 displays a per-frame quality prediction plot 350 over the entire video sequence. As illustrated in this particular embodiment, plot 350 provides the video quality normalized to a scale (γ-axis) as a function of time code or video frame number (x-axis) of the video. In some embodiments, comparison time plots may be provided for different video quality assessment methods. For example, time plots 350 may be displayed for both saliency-weighted SSIM and pure SSIM video quality assessment methods.

FIG. 4B illustrates a video frame 360 that may be displayed by display 330 using GUI 300, and a corresponding saliency map 370, pure SSIM visual differences 380, and saliency-weighted SSIM visual differences 390 that may be displayed by display 340 of GUI 300. In this example, red denotes highly visible artifacts, green denotes less visible artifacts, and the absence of color denotes no visible artifacts. As illustrated, the output 380 of SSIM without saliency weighting fails to account for the fact that the majority of the viewers will be focusing on the person and therefore will be less sensitive to the visual artifacts in the background. By contrast, the output 390 of the saliency-weighted SSIM method considers the viewer's focus on the person, the most salient region of the video frame.

Figure 5:
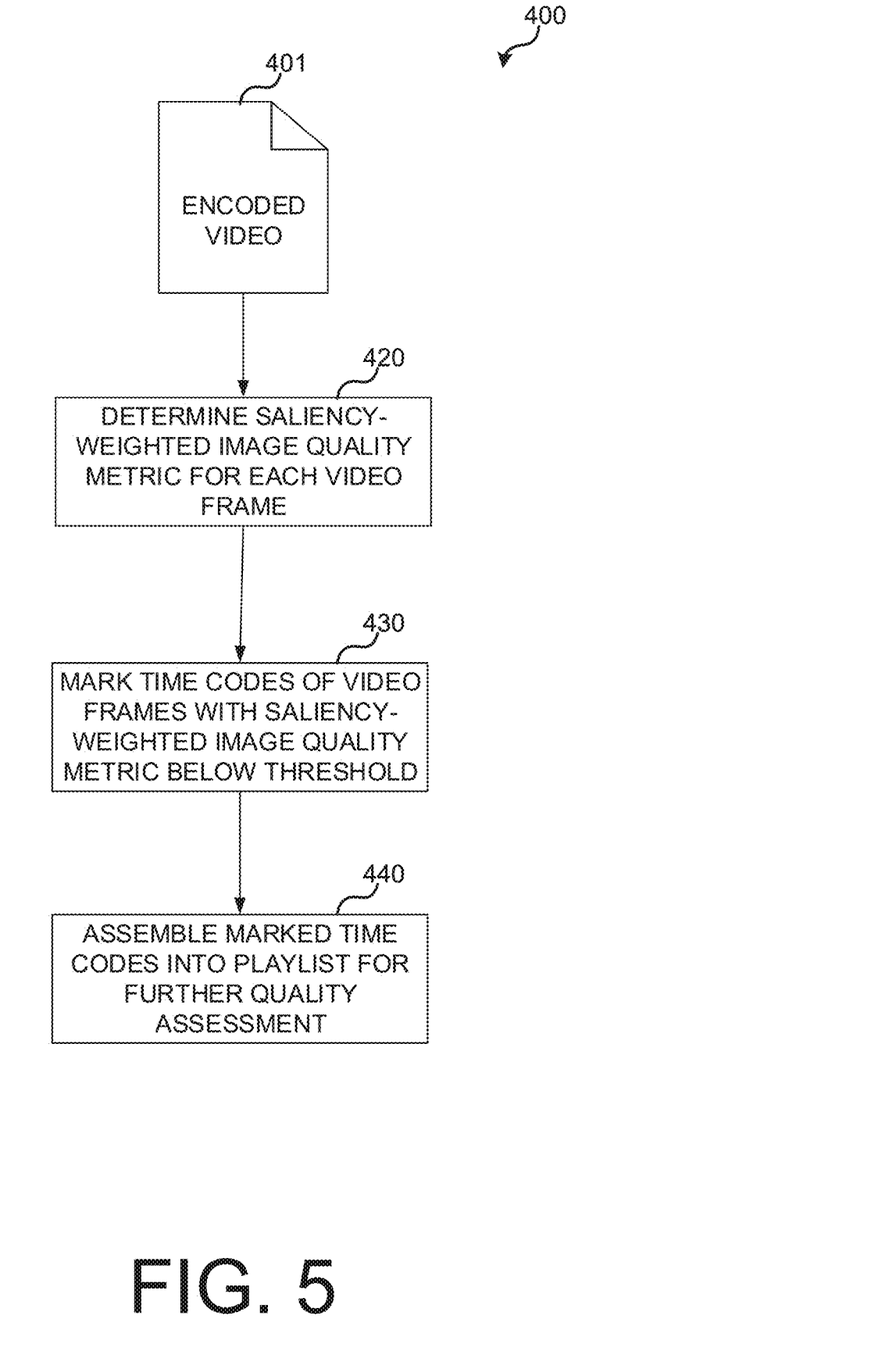
FIG. 5 is an operational flow diagram illustrating an example method of using the saliency-weighted image quality assessment method of FIG. 2 to automate and facilitate the quality control assessment of an encoded video in accordance with embodiments of the disclosure.

FIG. 5 is an operational flow diagram illustrating an example method 400 of using saliency-weighted image quality assessment method 200 to automate and facilitate the quality control assessment of an encoded video 401 in accordance with embodiments of the disclosure. In some embodiments, method 400 may be implemented by executing application 133, and method 400 may be visualized using GUI 300.

Method 400 begins at operation 420, where the saliency-weighted image quality metric is determined for each video frame of encoded video 401. In some embodiments, this metric may be determined by repeating method 200 for each video frame. At operation 430, the time codes or frame numbers of video frames with a saliency-weighted image quality metric that falls below a certain threshold may be marked for further quality assessment. In some embodiments, operation 430 may occur after or concurrent with operation 420 (e.g., time codes may be marked on an ad hoc basis after a frame's weighted image quality is determined). At operation 440, the marked time codes (i.e., frames with below threshold image quality) may be automatically assembled into a playlist for further quality assessment. By way of example, consider a two-hour encoded video 401 that must exceed a normalized threshold quality of 0.9 or 90%. If all but a two-minute segment of this video meets or exceeds a threshold quality of 0.9, method 400 may be used to create a playlist for playing back the two-minute segment. In this manner, a video quality control specialist may focus remedial action on the problematic two-minute segment.

Figure 6:
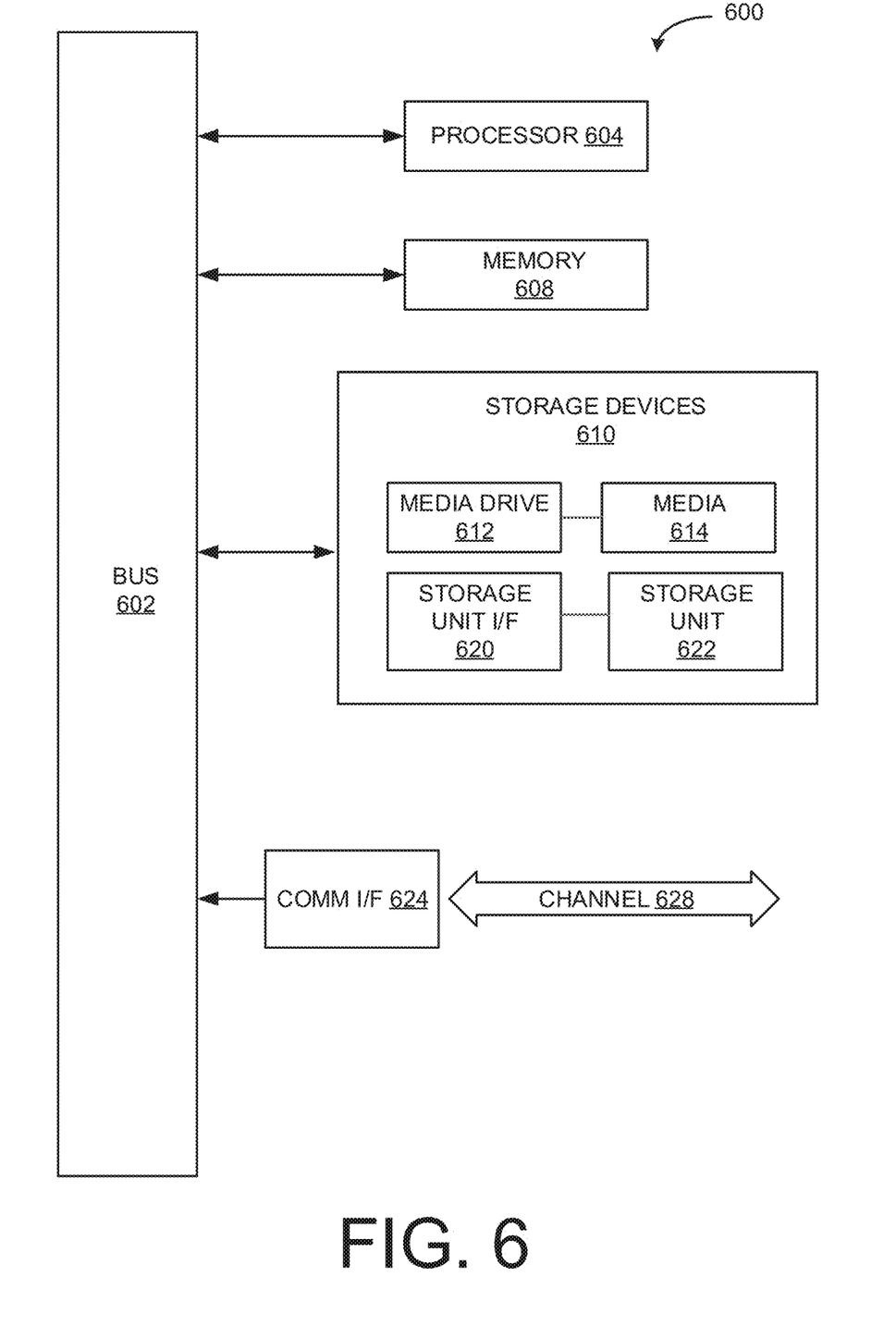
FIG. 6 illustrates an example computing module that may be used to implement various features of the saliency-weighted video quality assessment systems and methods disclosed herein.

FIG. 6 illustrates an example computing module that may be used to implement various features of the systems and methods disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example—computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD, DVD, or Blu-ray drive (R or RW), or other removable or fixed media drive might be provided. Accordingly, storage media 614 might include, for example, a hard disk, a solid state drive, magnetic tape, cartridge, optical disk, a CD, DVD, Blu-ray or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   receiving an encoded video;
   determining a saliency-weighted image quality metric for each video frame of a plurality of video frames of the encoded video;
   determining video frames of the plurality of video frames of the encoded video with a respective saliency-weighted image quality metric that is below a threshold; and
   assembling a playlist including the video frames of the encoded video with the respective saliency-weighted image quality metric that is below the threshold.

2. The method of claim 1, wherein determining the respective saliency-weighted image quality metric for a given video frame of the plurality of video frames of the encoded video comprises:

determining a per-pixel image quality vector of the given video frame;
determining per-pixel saliency values of the given video frame; and
computing the respective saliency-weighted image quality metric of the given video frame based on the per-pixel image quality vector and the per-pixel saliency values.

3. The method of claim 2, wherein the respective saliency-weighted image quality metric of the given video frame is determined based on the equation:

$$\hat{q} = \frac{1}{N}(q \cdot s^w),$$

wherein $\hat{q}$ is the respective saliency-weighted image quality metric of the given video frame, ($\cdot$) denotes an inner product, q is the per-pixel image quality vector of the given video frame, s is a vector of the per-pixel saliency values of the given video frame, w is a weight given to the vector s, and N is a number of pixels in the given video frame.

4. The method of claim 2, wherein determining the per-pixel image quality vector of the given video frame comprises comparing the given video frame with a reference video frame.

5. The method of claim 2, further comprising: displaying color-coded per-pixel visible difference visualization between the encoded video and a reference video.

6. The method of claim 5, wherein the color-coded per-pixel visible difference visualization is displayed for the given video frame of the encoded video using at least the per-pixel image quality vector and the per-pixel saliency values determined for the given video frame.

7. The method of claim 5, further comprising: providing a graphical user interface including one or more controls for selecting one of a plurality of video quality assessment methods to display the color-coded per-pixel visible difference visualization.

8. The method of claim 5, wherein the color-coded per pixel visible difference visualization displays no color to denote no visible artifacts or color to denote visible artifacts.

9. The method of claim 1, further comprising: displaying a quality prediction plot of the encoded video that provides video quality normalized as a function of time code or video frame number of the encoded video.

10. The method of claim 1, wherein assembling the playlist comprises:
marking time codes or frame numbers of the video frames of the encoded video with the respective saliency-weighted image quality metric below the threshold; and
assembling the marked time codes or frame numbers into the playlist.

11. A system, comprising:
a non-transitory computer-readable medium operatively coupled to a processor and having instructions stored thereon that, when executed by the processor, cause the system to:
receive an encoded video;
determine a saliency-weighted image quality metric for each video frame of a plurality of video frames of the encoded video;
determine video frames of the plurality of video frames of the encoded video with a respective saliency-weighted image quality metric that is below a threshold; and
assemble a playlist including the video frames of the encoded video with the respective saliency-weighted image quality metric that is below the threshold.

12. The system of claim 11, wherein determining the respective saliency-weighted image quality metric for a given video frame of the plurality of video frames of the encoded video comprises:
determining a per-pixel image quality vector of the given video frame;
determining per-pixel saliency values of the given video frame; and
computing the respective saliency-weighted image quality metric of the given video frame based on the per-pixel image quality vector and the per-pixel saliency values.

13. The system of claim 12, wherein the respective saliency-weighted image quality metric of the given video frame is determined based on the equation:

$$\hat{q} = \frac{1}{N}(q \cdot s^w),$$

wherein $\hat{q}$ is the respective saliency-weighted image quality metric of the given video frame, ($\cdot$) denotes an inner product, q is the per-pixel image quality vector of the given video frame, s is a vector of the per-pixel saliency values of the given video frame, w is a weight given to the vector s, and N is a number of pixels in the given video frame.

14. The system of claim 12, wherein determining the per-pixel image quality vector of the given video frame comprises comparing the given video frame with a reference video frame.

15. The system of claim 12, wherein the instructions, when executed by the processor, further cause the system to: display color-coded per-pixel visible difference visualization between the encoded video and a reference video.

16. The system of claim 15, wherein the color-coded per-pixel visible difference visualization is displayed for the given video frame of the encoded video using at least the per-pixel image quality vector and the per-pixel saliency values determined for the given video frame.

17. The system of claim 15, wherein the instructions, when executed by the processor, further cause the system to: provide a graphical user interface including one or more controls for selecting one of a plurality of video quality assessment methods to display the color-coded per-pixel visible difference visualization.

18. The system of claim 15, wherein the color-coded per pixel visible difference visualization displays no color to denote no visible artifacts or color to denote visible artifacts.

19. The system of claim 11, wherein the instructions, when executed by the processor, further cause the system to: display a quality prediction plot of the encoded video that provides video quality normalized as a function of time code or video frame number of the encoded video.

20. The system of claim 11, wherein assembling the playlist comprises:
marking time codes or frame numbers of the video frames of the encoded video with the respective saliency-weighted image quality metric below the threshold; and
assembling the marked time codes or frame numbers into the playlist.

* * * * *